(12) United States Patent
Nakagawa (10) Patent No.: US 7,015,421 B2
(45) Date of Patent: Mar. 21, 2006

(54) FUSION JOINING DEVICE FOR PLASTIC TUBES

(75) Inventor: Hisaji Nakagawa, Kanagawa (JP)

(73) Assignee: Flowell Corporation, Kanagawa (JP)

( * ) Notice: Subject to any disclaimer, the term of this patent is extended or adjusted under 35 U.S.C. 154(b) by 117 days.

(21) Appl. No.: 10/739,081

(22) Filed: Dec. 19, 2003

(65) Prior Publication Data

US 2004/0206741 A1    Oct. 21, 2004

(30) Foreign Application Priority Data

Dec. 20, 2002    (JP) .............................. 2002-369347

(51) Int. Cl.
H05B 3/02    (2006.01)

(52) U.S. Cl. .................. 219/243; 219/543; 219/535

(58) Field of Classification Search ............... 219/243, 219/535, 543; 228/212; 285/420, 41
See application file for complete search history.

(56) References Cited

U.S. PATENT DOCUMENTS

| | | | | |
|---|---|---|---|---|
| 3,065,536 A | * | 11/1962 | Chapman | .................. 228/212 |
| 4,329,569 A | * | 5/1982 | Hjortsberg et al. | ......... 219/535 |
| 4,695,712 A | * | 9/1987 | Busch | ......................... 219/535 |
| 5,107,095 A | * | 4/1992 | Derbyshire | .................. 219/243 |
| 5,352,871 A | * | 10/1994 | Ross et al. | .................. 219/633 |
| 5,484,506 A | * | 1/1996 | DuPont et al. | .............. 219/535 |
| 5,775,542 A | * | 7/1998 | Field | .......................... 219/535 |
| 6,762,396 B1 | * | 7/2004 | Abbott et al. | ............... 219/543 |
| 2001/0050278 A1 | * | 12/2001 | Chenault | .................... 219/535 |
| 2002/0005399 A1 | * | 1/2002 | Kodama et al. | ............ 219/243 |

* cited by examiner

Primary Examiner—Teresa J. Walberg (74) Attorney, Agent, or Firm—Takeuchi & Kubotera, LLP (57) ABSTRACT

A fusion joining device for plastic tubes with which a pair of clampers 30 is supported such that it can be pivoted between the closed position where the joint portion T1 is sandwiched from both sides through a pair of members for heat conduction 20 and the open position where the spacing between the pair of members for heat conduction 20 is widened; and a pair of heaters 40 made of a resistance heat generation material in the shape of a sheet is formed such that it is along the pair of members for heat conduction 20, respectively, in order to heat the joint portion T1 through the pair of members for heat conduction 20.

6 Claims, 9 Drawing Sheets

FUSION JOINING DEVICE FOR PLASTIC TUBES

FIELD OF THE INVENTION

The present invention relates to a fusion joining device for plastic tubes that heats the joint portion of plastic tubes for fusion joining the joint portion. Here, the term "plastic tubes" also refers to tubes which comprise a tube made of plastic, such as a plastic joint body and a plastic heat resistant cylinder.

BACKGROUND

With conventional fusion joining devices for plastic tubes, a heat fusion joinable plastic tube is loaded on the peripheral surface in the vicinity of the joint portion of plastic tubes, and the peripheral surface of this heat fusion joinable plastic tube is further tightly covered with a heat resistant cylinder, the heater being tightly contacted with the peripheral surface of this heat resistant cylinder such that the heat fusion joinable plastic tube is fusion joined to the peripheral surface in the vicinity of the joint portion by the conduction heat of the heater that is transferred through the heat resistant cylinder, in order to fusion join the plastic tubes to each other. The heater body is made of a heat conductive and insulating material, being formed in the shape of a semi-cylinder, and a heating element, such as a Nichrome wire, is disposed inside of the heater body. (Refer to Japanese Laid-Open Publication No. 8-174675, for example.)

However, with such a conventional fusion joining device for plastic tubes, which is based on the art as mentioned in Japanese Laid-Open Publication No. 8-174675, the disposal of a heating element, such as a Nichrome wire, in the heater body has increased the thickness of the heater, resulting in the entire device being a large-sized one, and the complicated configuration of the heater has been an obstacle to the reduction in cost.

Developed in consideration of such problems of the prior art, the present invention is intended to provide a fusion joining device for plastic tubes that uses a heater formed such that the resistance heat generation material in the shape of a sheet is along the member for heat conduction, in order to minimize the thickness of the heater for making the device body compact, and with which the configuration of the heater and the member for heat conduction is simplified for allowing the manufacturing cost to be reduced.

SUMMARY OF THE INVENTION

The subject matters of the present invention to achieve the above purposes are disclosed in the following items [1] to [7]:

[1] A fusion joining device for plastic tubes (T) which heats the joint portion (T1) of plastic tubes (T) for fusion joining the joint portion (T1), comprising a fusion joining head (10) for sandwiching said joint portion (T1) from both sides to heat the joint portion (T1), wherein said fusion joining head (10) comprises a pair of members for heat conduction (20), a pair of clampers (30), and a pair of heaters (40);

said pair of members for heat conduction (20) is disposed so as to be opposed to each other through said joint portion (T1);

said pair of clampers (30) is supported such that it can be pivoted between the closed position where it sandwiches said joint portion (T1) from both sides through said pair of members for heat conduction (20), and the open position where the spacing between said pair of members for heat conduction (20) is widened; and said pair of heaters (40) is made of a resistance heat generation material in the shape of a sheet, and is formed so as to be along said pair of members for heat conduction (20), respectively, for heating said joint portion (T1) through the pair of members for heat conduction (20).

[2] The fusion joining device for plastic tubes (T) as stated in item [1], wherein it comprises a supporting head (50) for removably supporting said fusion joining head (10), and a heating circuit (60) for supplying power to said fusion joining head (10) side through the supporting head (50);

said supporting head (50) supports said pair of clampers (30) pivotably between said closed position and said open position;

said heating circuit (60) comprises a pair of head electrodes (61, 62);

one of said pair of head electrodes (61, 62) is provided on said fusion joining head (10) side;

the other of said pair of head electrodes (61, 62) is provided on said supporting head (50) side;

said pair of head electrodes (61, 62) is connected to each other when said fusion joining head (10) is loaded onto said supporting head (50); and at least one of said pair of head electrodes (61, 62) is energized in the direction in which it is connected to the other of said pair of head electrodes (61, 62).

[3] The fusion joining device for plastic tubes (T) as stated in item [1], wherein said pair of heaters (40) is connected in series with each other.

[4] The fusion joining device for plastic tubes (T) as stated in item [1], wherein said heating circuit (60) comprises a pair of clamper electrodes (65, 66);

one of said pair of clamper electrodes (65, 66) is provided in one of said pair of clampers (30), being connected to one of said pair of heaters (40);

the other of said pair of clamper electrodes (65, 66) is provided in the other of said pair of clampers (30), being connected to the other of said pair of heaters (40);

said pair of heaters (40) is connected to the power supply side such that a voltage is generated across the pair of heaters (40); and said pair of clamper electrodes (65, 66) is disposed so as to be connected to each other at least when said pair of clampers (30) is pivoted to said closed position.

[5] The fusion joining device for plastic tubes (T) as stated in item [1], wherein it comprises controlling means (70) for adjusting the power to be supplied to said fusion joining head (10) side through said supporting head (50);

said supporting head (50) has a data detection section (55);

said fusion joining head (10) has specific data (19) for the fusion joining head (10);

said data detection section (55) detects said specific data (19) when said fusion joining head (10) is loaded onto said supporting head (50); and said controlling means (70) adjusts said power on the basis of the specific data (19) detected by said data detection section (55).

[6] The fusion joining device for plastic tubes (T) as stated in item [1], wherein
said clamper (30) comprises exhaust vents (36); and
said exhaust vents (36) are for exhausting the cooling air fed into said fusion joining head (10) through said supporting head (50) to the outside of said fusion joining head (10).

[7] The fusion joining device for plastic tubes (T) as stated in item [1], wherein
said fusion joining head (10) comprises a pair of adiabatic members (71);
said pair of clampers (30) comprises opposed surfaces (38) and accommodation recesses (35);
said opposed surfaces (38) are surfaces which are opposed to each other when said pair of clampers (30) is in said closed position, and where said adiabatic members (71) are disposed;
said accommodation recesses (35) are provided in said opposed surfaces (38) for accommodating said heaters (40) and said members for heat conduction (20);
said heater (40) is formed approximately in the shape of Ω in section, comprising a central portion (41) and both-end portions (45) which extend from both ends of the central portion (41), respectively;
the central portion (41) of said heater (40) is in the inside of the accommodation recess (35) of said clamper (30), being formed so as to be along said member for heat conduction (20); and
The both-end portion (45) of said heater (40) is extended from the accommodation recess (35) on said clamper (30) to the opposed surface (38) side of said clamper (30), being disposed so as to be along said adiabatic member (71).

Next, the function of the present invention will be described.

In order to fusion join the joint portion (T1) of plastic tubes (T), the joint portion (T1) is disposed between the pair of clampers (30) which is pivoted to the open position. Next, the pair of clampers (30) is pivoted from the open position to the closed position to sandwich the joint portion (T1) from both sides with the pair of members for heat conduction (20) before causing the pair of heaters (40) to generate heat, respectively. With the heat generation of the heaters (40), the joint portion (T1) is heated through the pair of members for heat conduction (20), which results in the joint portion (T1) being fusion joined. Thereafter, the pair of clampers (30) is pivoted from the closed position to the open position to allow the joint portion (T1) to be taken out from between the pair of members for heat conduction (20). Thus, by pivoting the pair of clampers (30) between the closed position and the open position, the joint portion (T1) can be easily sandwiched, and taken out with ease.

The pair of heaters (40) is made of a resistance heat generation material in the shape of a sheet, thus the thickness of the heaters (40) can be minimized. Thereby, the device body can be made compact. The member for heat conduction (20) does not need to have a complicated configuration, incorporating the heater (40), which results in both the member for heat conduction (20) and the heater (40) being configured simply, thereby the manufacturing cost can be reduced.

With a fusion joining device for plastic tubes that comprises a supporting head (50) which removably supports the fusion joining head (10) and a heating circuit (60) for supplying power to said fusion joining head (10) side through the supporting head (50), providing a plurality of types of fusion joining head (10) which is suited to the respective diameters of the joint portion (T1) to be fusion joined allows the respective types of fusion joining head (10) to be pivotably supported by a single supporting head (50). In addition, the heating circuit (60) comprises a pair of head electrodes (61, 62), and when the fusion joining head (10) is to be loaded onto the supporting head (50), the pair of head electrodes (61, 62) is connected to each other, thus the operation of loading the fusion joining head (10) and the operation of connecting the pair of head electrodes (61, 62) can be performed at a time, resulting in an improved operability.

At least one of the pair of head electrodes (61, 62) is energized in the direction in which it is connected to the other of the pair of head electrodes (61, 62), thus, if, during the operation of fusion joining the joint portion (T1), a slight vibration is caused to the pair of head electrodes (61, 62), the pair of head electrodes (61, 62) will not be separated from each other, thus being always maintained in the proper connection condition.

With a fusion joining device for plastic tubes in which the heating circuit (60) supplies power to the pair of heaters (40) in the fusion joining head (10), and the pair of heaters (40) is connected in series with each other, making the pair of heaters (40) have the same configuration and the same resistance will result in the same quantity of electricity flowing through the pair of heaters (40), respectively, and thus the same quantity of heat being generated from the pair of heaters (40), which means that the joint portion (T1) can be heated practically uniformly from both sides through the pair of members for heat conduction (20), and thus the joint portion (T1) can be properly fusion joined.

With a fusion joining device for plastic tubes in which the heating circuit (60) comprises a pair of clamper electrodes (65, 66), and the pair of clamper electrodes (65, 66) is provided in the pair of clampers (30), respectively, one clamper electrode is connected to one of the pair of heaters (40), and the other clamper electrode is connected to the other of the pair of heaters (40). The pair of heaters (40) is connected to the power supply side such that a voltage is generated across the pair of heaters (40). The pair of clamper electrodes (65, 66) is connected to each other at least when the pair of clampers (30) is pivoted to the closed position. Thereby, when the pair of clampers (30) is in the closed position, the pair of heaters (40) is connected in series with each other.

With a fusion joining device for plastic tubes that comprises controlling means (70) for adjusting the power to be supplied to the fusion joining head (10) side through the supporting head (50), and in which the supporting head (50) has a data detection section (55), and the fusion joining head (10) has specific data (19), loading the fusion joining head (10) onto the supporting head (50) allows the data detection section (55) to detect the specific data (19). The controlling means (70) adjusts the power to be supplied to the fusion joining head (10) side on the basis of the specific data (19) detected by the data detection section (55). Thereby, the proper power which is suited to the diameter of the joint portion (T1) can be supplied to the heater (40) on the fusion joining head (10) side.

With a fusion joining device for plastic tubes in which the clamper (30) comprises exhaust vents (36), it is necessary to cool the heater (40) after the completion of heating the joint portion (T1). To do this, the pump is operated to feed the cooling air to the fusion joining head (10) through the supporting head (50). By the air fed in, the heat is rapidly removed from the heater (40), and thus the heater (40) can be cooled in a short period of time, thereby the joint portion (T1) can be cooled. The air which has removed the heat from the heater (40) is exhausted to the outside of the fusion joining head (10) through the exhaust vents (36), which results in the cooling air being fed into the fusion joining head (10) in sequence.

With a fusion joining device for plastic tubes in which an adiabatic member (71) is disposed on the opposed surface (38) in the clamper (30); a heater (40) and a member for heat conduction (20) are accommodated in the accommodation recess (35) in the clamper (30); the heater (40) is formed approximately in the shape of Ω in section, and comprises a central portion (41), and both-end portions (45) which extend from both ends of the central portion (41), respectively; the central portion (41) of the heater (40) is in the inside of the accommodation recess (35) of the clamper (30), being formed so as to be along the member for heat conduction (20); and the both-end portion (45) of the heater (40) is extended from the accommodation recess (35) of the clamper (30) to the opposed surface (38) side, being disposed such that it is along the heat insulation member (71), if the temperature of the tip of the both-end portion (45) of the heater (40) is lowered in the state in which the heater (40) generates heat, the temperature of the greater part of the central portion (41) and both-end portion (45) of the heater (40) is maintained at a level equal to or higher than the desired one, and the joint portion (T1) can be properly heated by the heat from the central portion (41) and the both-end portion (45) of the heater (40) through the member for heat conduction (20).

In addition, the both-end portion (45) is extended from the central portion (41) of the heater (40), and the both-end portion (45) is connected to the power supply through the electrode, thus the both-end portion (45) of the heater (40) lies between the joint portion (T1) and the electrode, which allows the electrode and other metallic parts to be disposed away from the joint portion (T1). Metallic parts which are disposed in the clamper (30) and the like are subjected to high temperature due to the heat generation of the heater (40), easily forming an oxide film. However, because the metallic parts are separated from the joint portion (T1), it is difficult that the joint portion (T1) is contaminated by the oxide film of the metallic parts. Further, the both-end portion (45) of the heater (40) is disposed such that it is along the heat insulation member (71), thus the temperature of the both-end portion (45) of the heater (40) except the tip of the both-end portion (45) of the heater (40) can be prevented from being lowered, thereby the temperature of the greater part of the central portion (41) and both-end portion (45) of the heater (40) can be easily maintained at a level equal to or higher than the desired one.

BRIEF DESCRIPTION OF THE DRAWINGS

FIG. 5(A) being a plan view of the plate member, and FIG. 5(B) being a front view the plate member;

FIG. 6(A) to FIG. 6(D) show a plate member which is provided on the heating head and on which a metallic pattern is formed as the specific data; FIG. 6(A) to FIG. 6(D) showing a plan view of the respective types of metallic pattern;

FIG. 7(A) being a plan view of the data detection section, and FIG. 7(B) being a front view of the data detection section;

FIG. 8(A) and FIG. 8(B) are plan views showing the inside of the fusion joining device by removing the upper halves of the heating head and the supporting head; FIG. 8(A) being a plan view showing the state before the heating head being loaded onto the supporting head, and FIG. 8(B) being a plan view showing the state after the heating head being loaded onto the supporting head.

DESCRIPTION OF THE PREFERRED EMBODIMENTS

Hereinbelow, one embodiment of the present invention will be described with reference to the drawings.

The drawings show the one embodiment of the present invention.

A fusion joining device according to the present embodiment heats the joint portion T1 of plastic tubes T for fusion joining the joint portion T1. The fusion joining device comprises a fusion joining head 10 for sandwiching the joint portion T1 from both sides to heat the joint portion T1. In the present embodiment, the joint portion T1 is formed by fitting the plastic tubes T in a joint body T2, and further, externally fitting a housing T3, which is a heat resistant cylinder, to the fitted portion. The plastic tube T and the joint body T2 are each made of a fluorocarbon plastic material, such as PFA (copolymer of tetrafluoroethylene/perfluoroalkyl vinyl ether), and the housing T3 is made of a fluorocarbon plastic material, such as poly tetrafluoroethylene.

As shown in FIG. 1 to FIG. 4, FIG. 8(A) and FIG. 8(B), the fusion joining head 10 comprises a pair of members for heat conduction 20, a pair of clampers 30, and a pair of heaters 40. The pair of members for heat conduction 20 is disposed such that the members for heat conduction 20 are opposed to each other through the joint portion T1.

The members for heat conduction 20 are made of a thermally conductive ceramic material, being formed semi-cylindrically. The members for heat conduction 20 have a wall thickness of approx. 1.2 mm. The inner peripheral surface 21 and the outer peripheral surface 22 of the members for heat conduction 20 are cut such that they are smooth.

Figure 3:
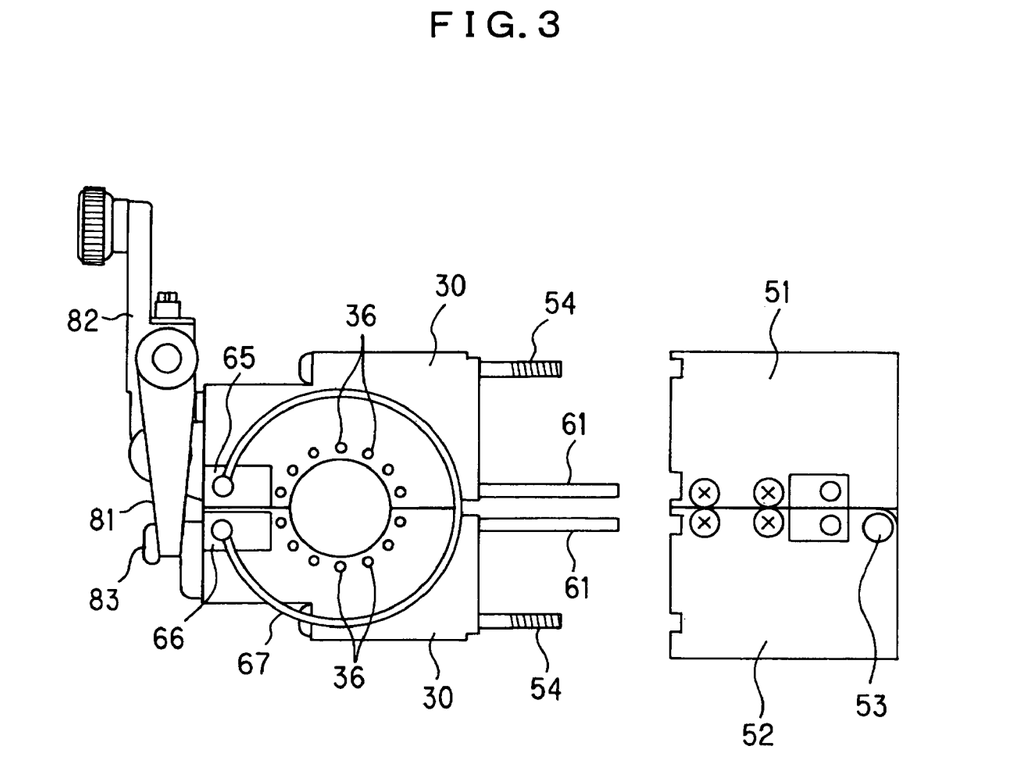
FIG. 3 is a front view showing the heating head and the supporting head of the fusion joining device.
Figure 4:
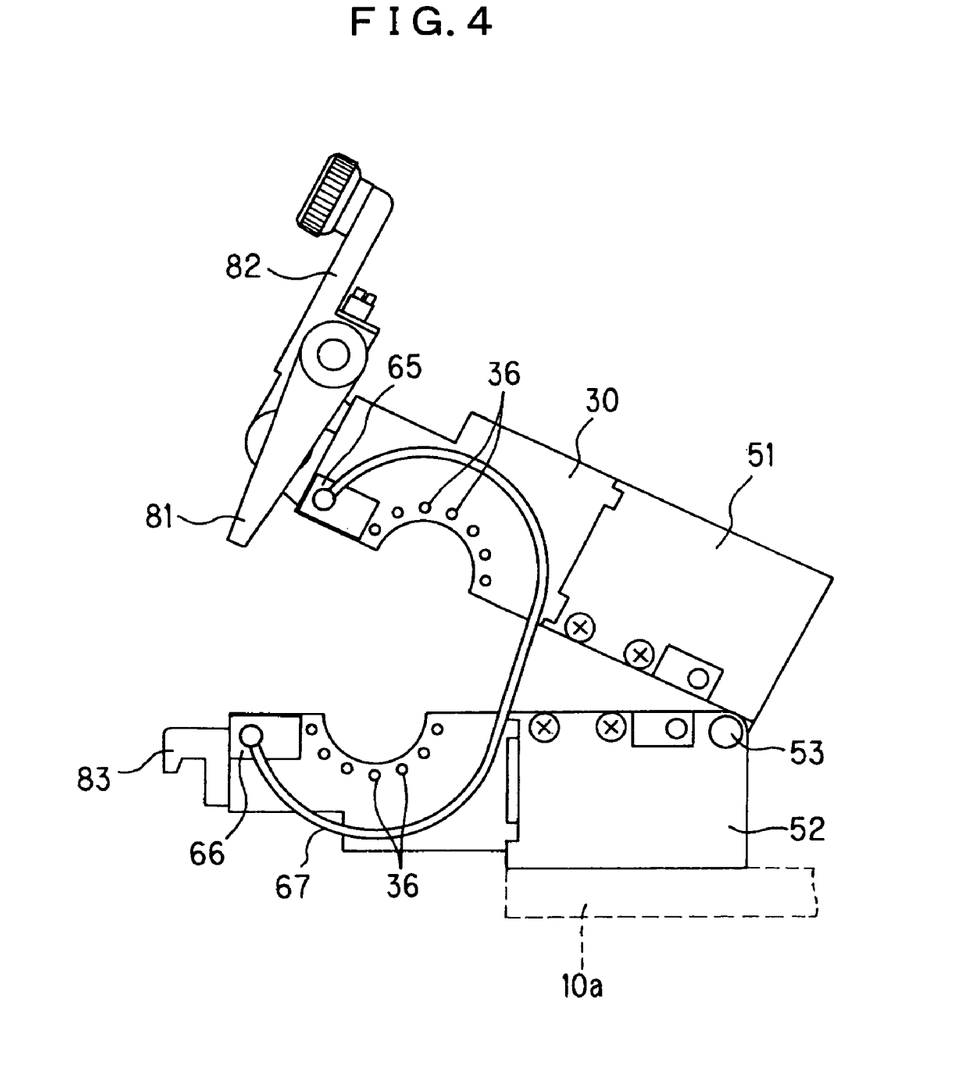
FIG. 4 is a front view of the fusion joining device when the pair of clampers in the heating head is pivoted to the open position.
Figure 5:
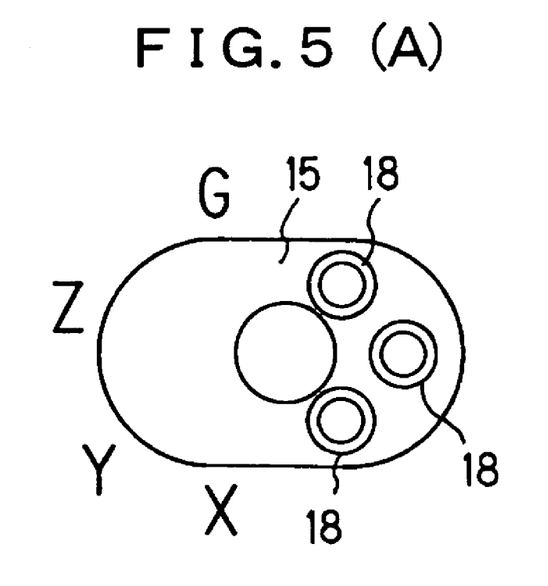
FIG. 5(A) and FIG. 5(B) show a plate member which is provided on the heating head and on which a metallic pattern is formed as the specific data.
Figure 6:
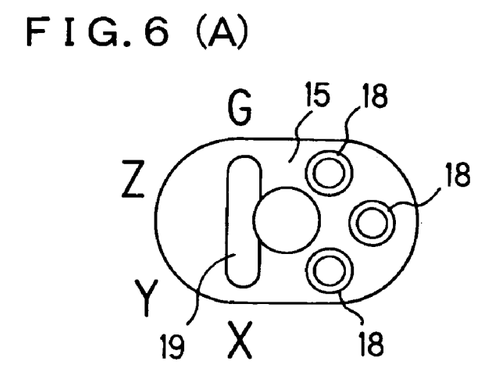
Figure 7:
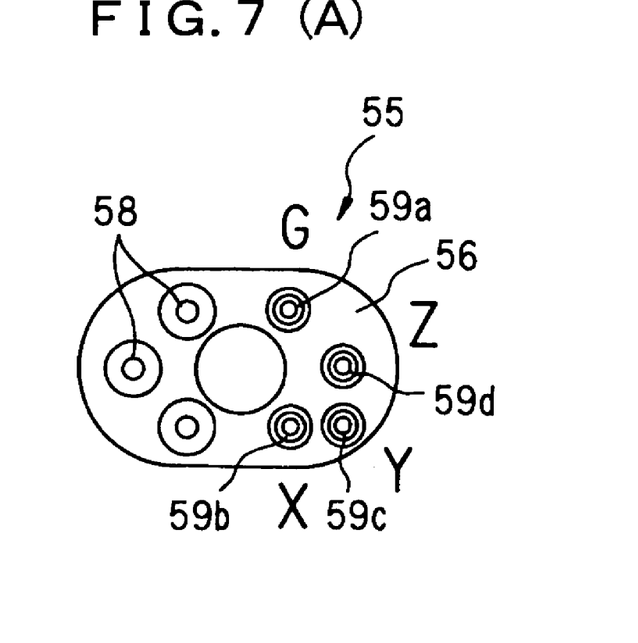
FIG. 7(A) and FIG. 7(B) show a data detection section for detecting the metallic pattern which provides the specific data of the heating head.

The pair of clampers 30 is supported such that the clampers 30 can be pivoted between the closed position, where they sandwich the joint portion T1 from both sides through the pair of members for heat conduction 20, and the open position, where the spacing between the pair of members for heat conduction 20 is widened. One clamper 30 is provided with a clamping fitting 81 and a handle member 82, and the other clamper 30 is provided with a hooking member 83. The clamping fitting 81 is engaged with the hooking member 83 by operating the handle member 82 for constraining the pair of clampers 30 in the closed position, and is disengaged from the hooking member 83 for releasing the pair of clampers 30 such that the clampers 30 can be pivoted from the closed position as shown in FIG. 3 to the open position as shown in FIG. 4.

The clamper 30 comprises an accommodation recess 35 for accommodating the heater 40 and the member for heat conduction 20, and exhaust vents 36. Between the peripheral wall of the accommodation recess 35 and the outer peripheral surface of the heater 40 is formed a clearance 37 for heater cooling. The exhaust vents 36 are provided for exhausting the cooling air fed into the clearance 37 for heater cooling in the fusion joining head 10 through a supporting head 50 by a pump (not shown) to the outside of the fusion joining head 10. The pump is incorporated in the device body together with the power supply and others.

The pair of clampers 30 comprises opposed surfaces 38 and the accommodation recesses 35, the opposed surfaces 38 being surfaces which are opposed to each other when the pair of clampers 30 is in the closed position, and being provided with heat insulation members 71 made of ceramics. The accommodation recess 35 is a recess provided in the opposed surface 38 for accommodating the heater 40 and the member for heat conduction 20.

The pair of heaters 40 is made of a resistance heat generation material in the form of a sheet, being formed such that the heaters 40 are along the pair of members for heat conduction 20, respectively, and heat the joint portion T1 through the pair of members for heat conduction 20. As the resistance heat generation material, a Nichrome material or a chrome-Al material is used. The heater 40 has a sheet thickness of approx. 0.2 mm, and is fixed to the member for heat conduction 20 by means of a wire made of stainless steel.

The heater 40 is formed approximately in the sectional shape of $\Omega$, being provided with a central portion 41 and both-end portions 45 which extend from both ends of the central portion 41, respectively. The central portion 41 of the heater 40 is in the accommodation recess 35 of the clamper 30, being formed such that it is along the member for heat conduction 20. The both-end portion 45 of the heater 40 is extended from the accommodation recess 35 of the clamper 30 to the opposed surface 38 side, being disposed such that it is along the heat insulation member 71.

The fusion joining device comprises a supporting head 50 which removably supports the fusion joining head 10, and a heating circuit 60 for supplying power to the fusion joining head 10 side through the supporting head 50. The supporting head 50 supports the pair of clampers 30 such that the clampers 30 can be pivoted between the closed position and the open position. In the supporting head 50, a pair of supporting blocks 51, 52 is supported by a pivot 53 such that the supporting blocks 51, 52 can be pivoted. The pair of clampers 30 is fixed to the pair of supporting blocks 51, 52 by means of setscrews 54.

The heating circuit 60 comprises a pair of head electrodes 61, 62. The one-side head electrode 61 is provided in the pair of clampers 30 in the fusion joining head 10, respectively. The other-side head electrode 62 is provided in the pair of supporting blocks 51, 52 in the supporting head 50, respectively. One of the other-side head electrodes 62 is connected to the positive side of the power supply, while the other of the other-side head electrodes 62 is connected to the negative side of the power supply. The one-side head electrode 61 is screwed such that the end portion 45 of the heater 40 is sandwiched by the one-side head electrode 61. The sandwiched portion 45a of the end portion 45 of the heater 40 that is sandwiched by the head electrode 61 has approximately the same width of the head electrode 61.

Figure 1:
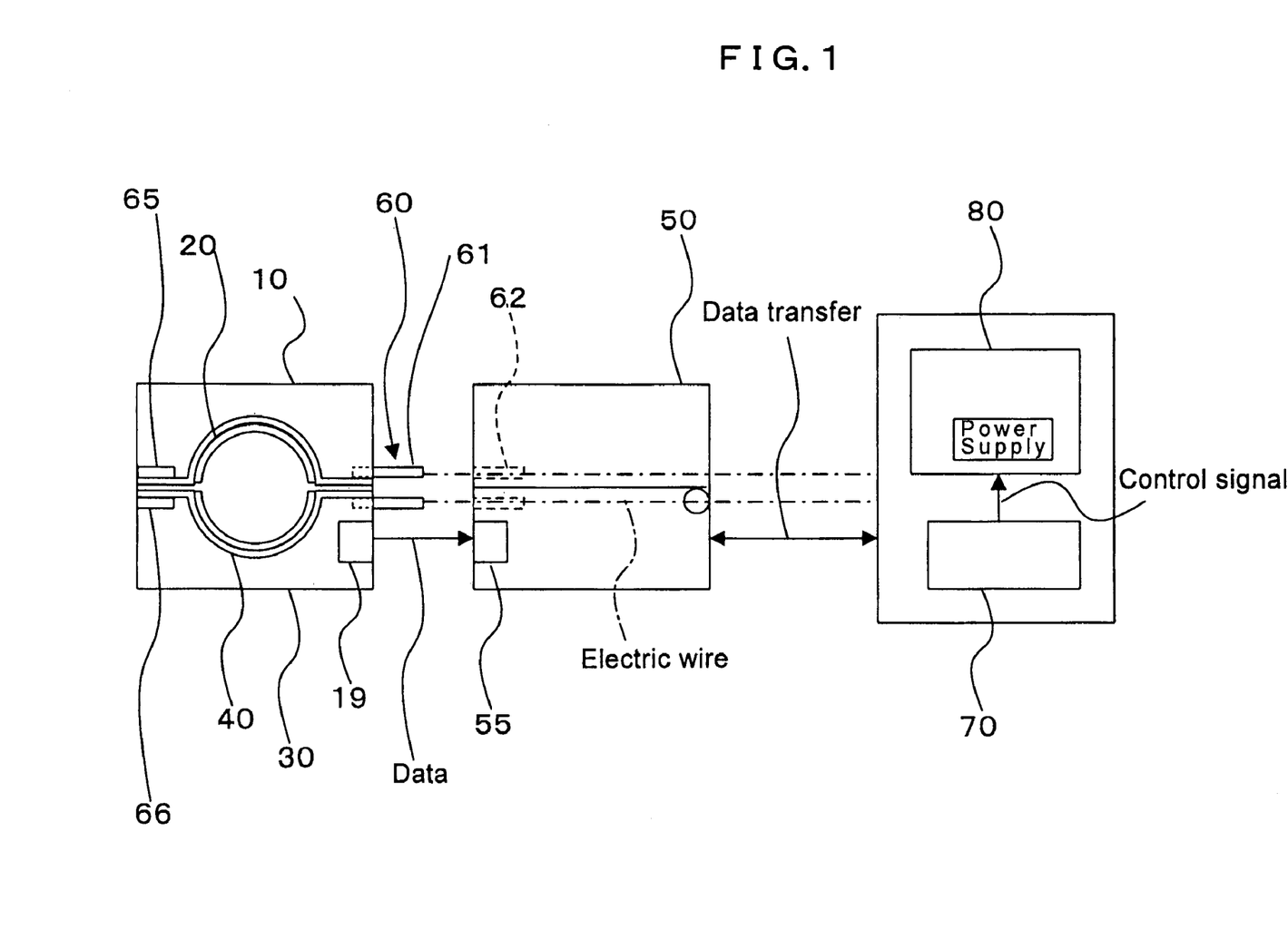
FIG. 1 is a block diagram of a fusion joining device for plastic tubes according to one embodiment of the present invention.
Figure 2:
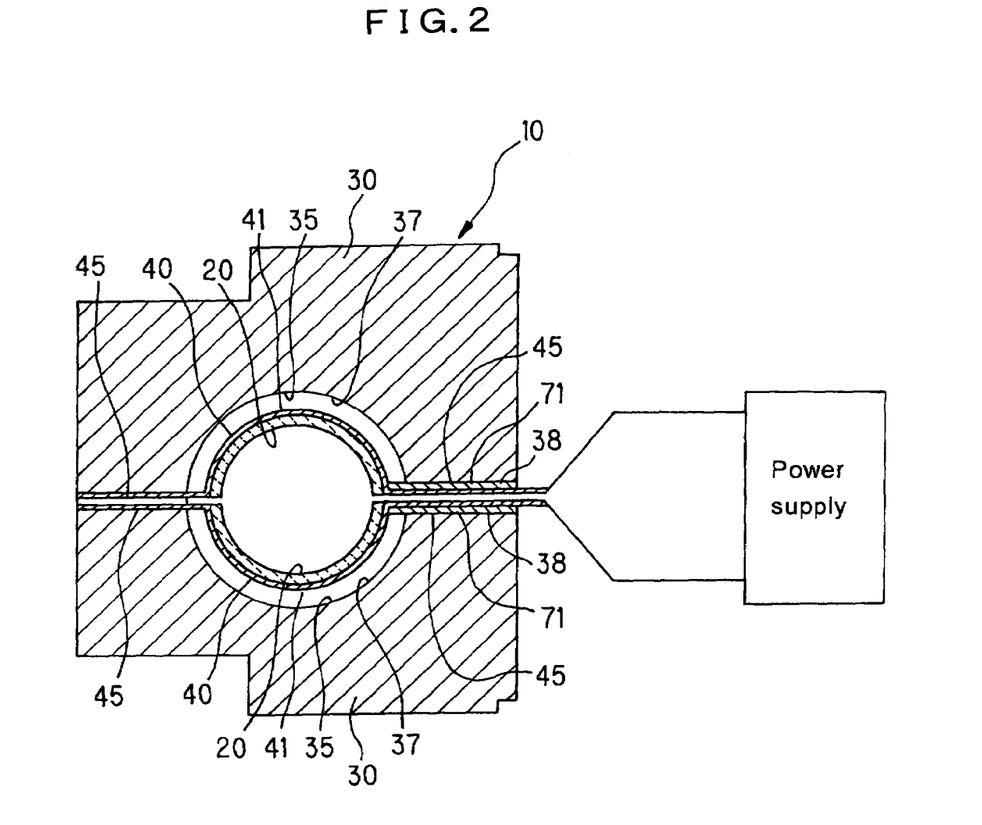
FIG. 2 is a sectional view of the critical portions of the heating head of the fusion joining device.
Figure 8:
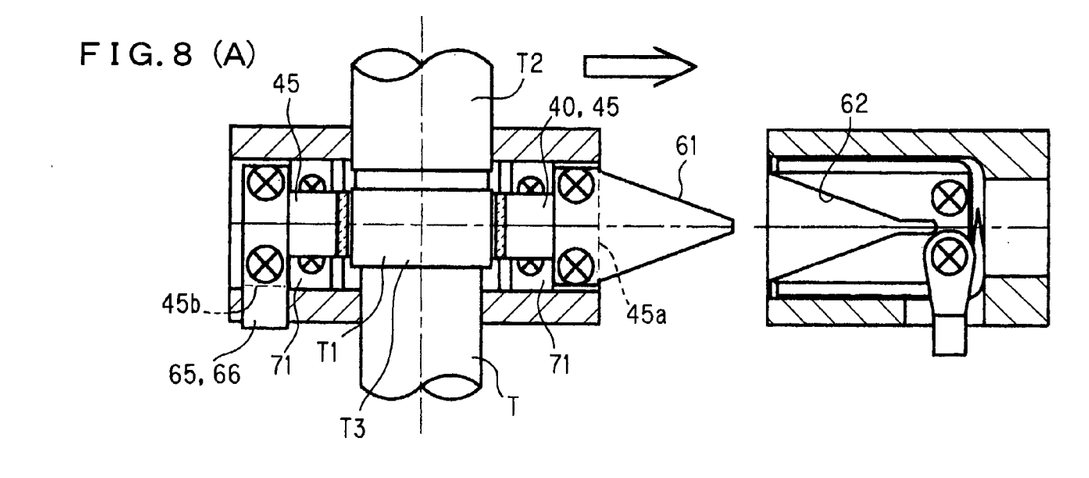

The pair of head electrodes 61, 62 is formed such that, when the fusion joining head 10, which is shown in FIG. 1, FIG. 3, and FIG. 8(A), respectively, is loaded onto the supporting head 50 as shown in FIG. 8(B) from the removed state, the head electrodes 61, 62 are connected to each other. The other-side head electrode 62 is energized by a compression spring 63 in the direction in which it is connected to the head electrode 61. The one-side head electrode 61 is made of an aluminum material, being formed in the tapered shape, while the other-side head electrode 62 is similarly made of an aluminum material, being formed in the reverse-tapered shape.

The heating circuit 60 comprises a pair of clamper electrodes 65, 66, the one-side clamper electrode 65 being provided in the one-side clamper 30, and being connected to the positive side of the power supply through the one-side heater 40 and the pair of head electrodes 61, 62. The other-side clamper electrode 66 is provided in the other-side clamper 30, and connected to the negative side of the power supply through the other-side heater 40 and the pair of head electrodes 61, 62. The pair of clamper electrodes 65, 66 is connected to each other by means of a jumper wire 67. Through the jumper wire 67, the pair of heaters 40 is connected in series with each other. The pair of clamper electrodes 65, 66 is screwed such that the end portion 45 of the heater 40 is sandwiched by the clamper electrode 65, 66. The sandwiched portion 45b of the end portion 45 of the heater 40 that is sandwiched by the clamper electrode 65, 66 has approximately the same width of the clamper electrode 65, 66.

As shown in FIG. 5(A) to FIG. 7(B), the supporting head 50 has a data detection section 55. To the base 56 of the data detection section 55, a screw member 57 for mounting to the supporting head 50 is fixed, and a plurality of plugs 58 and four detection pins 59a to 59d are disposed.

The fusion joining head 10 has specific data for the fusion joining head 10. To the fusion joining head 10, a plate member 15 is fixed by means of a screw member 17. On the plate member 15, a jack 18 is disposed and, in addition, a metallic pattern 19, which provides specific data, is printed or coated. The jack 18 is for use with a temperature sensor 85 later described.

To assure that any of the detection pins 59a to 59d as shown in FIG. 7(A) and FIG. 7(B) with the locations G, X, Y, and Z is not in contact with the pattern 19, the plate member 15 as shown in FIG. 5(A) and FIG. 5(B) is not provided with a pattern 19. To assure that the detection pins 59a and 59b as shown in FIG. 7(A) and FIG. 7(B) with the locations G and X are in contact with the pattern 19, the plate member 15 as shown in FIG. 6(A) is provided with a pattern 19 which is extended straight from G to X. Further, to assure that the detection pins 59a and 59c as shown in FIG. 7(A) and FIG. 7(B) with the locations G and Y are in contact with the pattern 19, the plate member 15 as shown in FIG. 6(B) is provided with a pattern 19 which is extended slant from G to Y.

Further, to assure that the detection pins 59a, 59b, and 59c as shown in FIG. 7(A) and FIG. 7(B) with the locations G, X, and Y are in contact with the pattern 19, the plate member 15 as shown in FIG. 6(C) is provided with a pattern 19 which is extended from G to Y through X. Further, to assure that the detection pins 59a and 59d as shown in FIG. 7(A) and FIG. 7(B) with the locations G and Z are in contact with the pattern 19, the plate member 15 as shown in FIG. 6(D) is provided with a pattern 19 which is extended slant from G to Z.

The detection pins 59a to 59d in the data detection section 55 detect the pattern 19, which is the specific data, when the fusion joining head 10 is loaded onto the supporting head 50. The plate member 15 as shown in FIG. 5(A) and FIG. 5(B) corresponds to the joint portion T1 of ¼ in. in size. The respective plate members 15 as shown in FIGS. 6(A) to 6(D) correspond to the joint portion T1 of ⅜ in., ½ in., ¾ in., and 1 in. in size. The controlling means 70 adjusts the power on the basis of the pattern 19 as the specific data that is detected by the data detection section 55.

Figure 9:
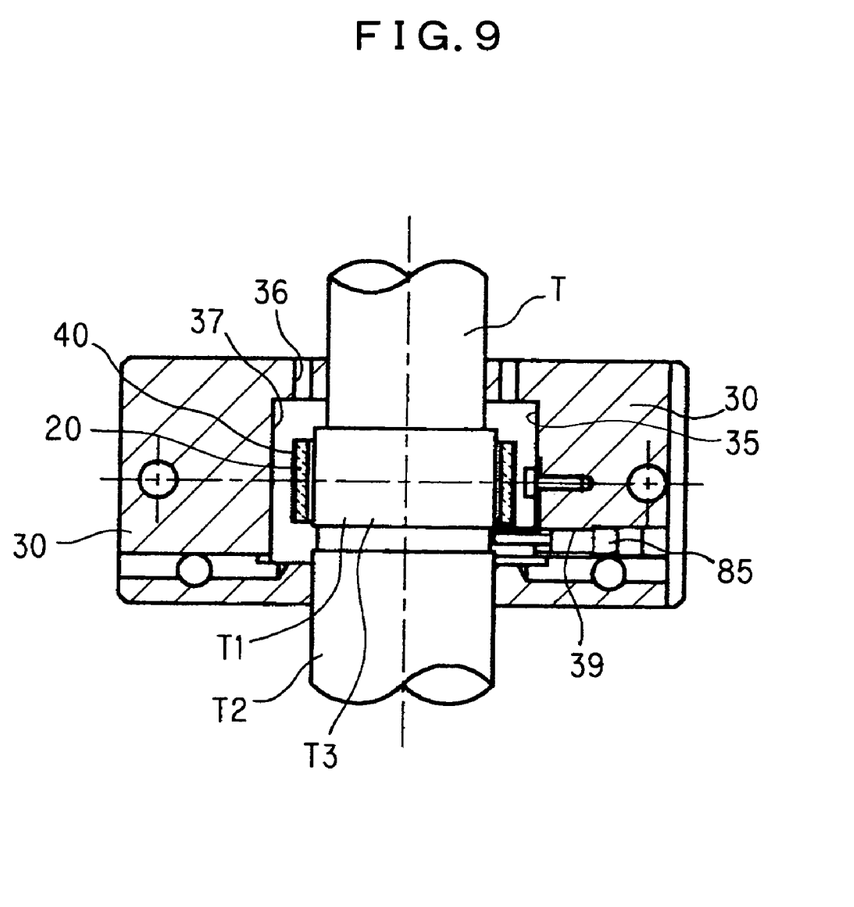
FIG. 9 is a sectional view showing the disposal of the temperature sensor and the like by cutting away the heating head along the axis of the joint portion.

As shown in FIG. 9, a clearance hole 39 is provided from the outer peripheral surface of the clamper 30 toward the accommodation recess 35, and in the clearance hole 39, a temperature sensor 85 is fitted. The temperature sensor 85 is passed through the side of the heater 40 and the member for heat conduction 20 to be contacted with the area between the joint portion T1 and the joint body T2 for detecting the temperature of the joint portion T1. The detected temperature data is fed to the controlling means 70. The controlling means 70 controls the power supply means 80 on the basis of the temperature data for shutting of f the supply power to the heater 40. The controlling means 70 adjusts the power to be supplied to the heater 40 on the basis of the atmospheric temperature. Further, the controlling means 70 controls the pump (not shown) for delivering the cooling air to the fusion joining head 10 through the supporting head 50, or contrarily, interrupting the delivery.

Next, the function will be described.

Where the diameter of the joint portion T1 to be fusion joined varies, it is necessary to provide a plurality of types of fusion joining head 10 that is suited for the respective diameters of the joint portion T1 to be fusion joined. On the other hand, it is not necessary to provide a plurality of types of supporting head 50 that is suited for the respective diameters of the joint portion T1. Because the supporting head 50 removably supports the fusion joining head 10, a plurality of types of fusion joining head 10 can each be supported by a single supporting head 50. Thereby, the number of supporting heads 50 to be provided may be reduced.

When the fusion joining head 10 is to be loaded onto the supporting head 50, the head electrode 61 on the fusion joining head 10 side and the head electrode 62 on the supporting head 50 side are connected to each other, thus the operation of loading the fusion joining head 10 and the operation of connecting the pair of head electrodes 61, 62 can be performed at a time.

The pair of clamper electrodes 65, 66 is always connected to each other by means of the jumper wire 67, thus the pair of heaters 40 is always connected in series with each other regardless of whether the pair of clampers 30 is in the closed position or the open position.

The detection pins 59a to 59d in the data detection section 55 are projected toward the fusion joining head 10 from the supporting head 50, while the plate member 15 is disposed on the surface of the fusion joining head 10 that is opposed to the detection pins 59a to 59d, thus, depending upon whether or not the detection pins 59a to 59d are contacted with the pattern 19, resulting in the energized state is caused, when the fusion joining head 10, which is shown in FIG. 1, FIG. 3, and FIG. 8(A), respectively, is loaded onto the supporting head 50 as shown in FIG. 8(B) from the removed state, the specific data for the fusion joining head 10 is detected, the specific data is fed to the controlling means 70, the fusion joining head 10 comprising the pattern 19 as the specific data is identified, and the diameter of the joint portion T1 to be fusion joined by means of the fusion joining head 10 is determined, which allows the controlling means 70 to control the power supply means 80 for supplying the power suited for the diameter of the joint portion T1 to the heater 40.

Further, to increase the mutual contact area, the one-side head electrode 61 is formed in the tapered shape, while the other-side head electrode 62 is formed in the reverse-tapered shape, thus when the fusion joining head 10 is loaded onto the supporting head 50, and the one-side head electrode 61 is fitted in the other-side head electrode 62, a low-voltage high-current can be supplied to the fusion joining head 10 side through the one-side head electrode 61 and the other-side head electrode 62.

In order to fusion join the joint portion T1, the pair of clampers 30 is pivoted from the closed position to the open position around the pivot 53 in the supporting head 50, the spacing between the pair of members for heat conduction 20 is widened, and between the pair of members for heat conduction 20, the joint portion T1 is disposed. In this case, the pair of members for heat conduction 20 is opposed to each other through the joint portion T1. Then, the pair of clampers 30 is pivoted from the open position to the closed position for sandwiching the joint portion T1 from both sides by means of the pair of members for heat conduction 20.

When the controlling means 70 controls the power supply means 80 for supplying the power suited for the diameter of the joint portion T1 to the heater 40, the same quantity of electricity flows through the pair of heaters 40, respectively, because the pair of heaters 40 connected in series have the same configuration and the same resistance, and thus the same quantity of heat is generated from the pair of heaters 40, which means that the joint portion T1 can be heated practically uniformly from both sides through the pair of members for heat conduction 20, and thus the joint portion T1 can be properly fusion joined.

The clearance 37 for heater cooling serves as an adiabatic layer in heat generation of the heater 40, which makes it difficult for the heat of the heater 40 to be transferred to the clamper 30. In addition, the both-end portion 45 of the heater 40 is disposed such that it is along the heat insulation member 71, thus the temperature of the greater part of the both-end portion 45 except the tip of the both-end portion 45 of the heater 40 can be prevented from being lowered, thereby the temperature of the greater part of the central portion 41 and both-end portion 45 of the heater 40 can be easily maintained at a level equal to or higher than the desired one. If, in heating the joint portion T1, the temperature of the tip of the both-end portion 45 of the heater 40 is lowered, the temperature of the greater part of the central portion 41 and both-end portion 45 of the heater 40 is maintained at a level equal to or higher than the desired one, and the joint portion T1 can be properly heated by the heat from the central portion 41 of the heater 40 through the member for heat conduction 20.

The other-side head electrode 62 is energized by the compression spring 63 in the direction in which it is connected to the one-side head electrode 61, thus, if the vibration during the operation of fusion joining the joint portion T1 is transmitted to the pair of head electrodes 61, 62, the pair of head electrodes 61, 62 will not be separated from each other by the vibration during the fusion joining operation, thus the pair of head electrodes 61, 62 being always maintained in the proper connection condition.

After the completion of heating the joint portion T1, it is necessary to cool the heater 40. To do this, the air can be fed to the clearance 37 for heater cooling in the fusion joining head 10 through the supporting head 50. By the air fed in, the heat is rapidly removed from the heater 40, and thus the heater 40 can be cooled in a short period of time, thereby the joint portion T1 can be cooled. The air fed into the clearance 37 for heater cooling is exhausted to the outside of the fusion joining head 10 through the exhaust vents 36.

Thus, after fusion joining the joint portion T1, the pair of clampers 30 is pivoted from the closed position to the open position to widen the spacing between the pair of members for heat conduction 20 for allowing the joint portion T1 to be taken out from between the pair of members for heat conduction 20. Thus, by pivoting the pair of clampers 30, the joint portion T1 can be easily sandwiched and can be taken out with ease.

In the fusion joining head 10, the both-end portion 45 is extended from the central portion 41 of the heater 40, and the both-end portion 45 is connected to the power supply through the electrode, thus the both-end portion 45 of the heater 40 lies between the joint portion T1 and the electrode, which allows the electrode and other metallic parts to be disposed away from the joint portion T1. Metallic parts which are disposed in the clamper 30 and the like are subjected to high temperature due to the heat generation of the heater 40, easily forming an oxide film. However, because the metallic parts are separated from the joint portion T1, it is difficult that the joint portion T1 is contaminated by the oxide film of the metallic parts.

In the fusion joining head 10, the pair of heaters 40 is made of a resistance heat generation material in the form of a sheet, which allows the thickness of the heater 40 to be minimized. Because the heater 40 may be formed such that it is along the member for heat conduction 20, the geometry of the heater 40 can be created with accuracy by means of simple dies, which leads to the reduction in the cost of manufacturing the heater 40. On the other hand, the member for heat conduction 20 separates the heater 40 from the joint portion T1, being made of, say, a ceramic material having a thermal conductivity and an electrical insulation. The member for heat conduction 20 may be formed approximately in the shape of a semi-cylinder having a diameter suited for the diameter of the joint portion T1, thus the geometry of the member for heat conduction 20 can be created accurately and easily, which leads to the reduction in the cost of manufacturing the member for heat conduction 20. To increase the efficiency of heat conduction, the inner peripheral surface of the member for heat conduction 20 is formed smoothly by cutting or the like such that it can be tightly contacted with the joint portion T1, and the outer peripheral surface of the member for heat conduction 20 is formed smoothly by cutting or the like such that it can tightly contact with the heater 40 in the form of a sheet.

In said embodiment, the pair of clamper electrodes 65, 66 is connected to each other by the jumper wire 67, however, the pair of clamper electrodes 65, 66 may be connected to each other at least when the pair of clampers 30 is pivoted to the closed position. Thereby, when the pair of clampers 30 is in the closed position, the pair of heaters 40 is connected in series with each other, and when the pair of clampers 30 is in the open position, the pair of heaters 40 may be disconnected, however, when the pair of clampers 30 is in the open position, the operation of fusion joining the joint portion T1 is not performed, which means that the pair of heaters 40 is not required to be powered, thus if the pair of heaters 40 is disconnected, no obstacles can occur.

In the embodiment, the one-side head electrode 61 is formed in the tapered shape, while the other-side head electrode 62 is formed in the reverse-tapered shape, such that the one-side head electrode 61 can be fitted in the other-side head electrode 62 with an increased mutual contact area, however, the embodiment is not limited to this, and one of the pair of head electrodes 61, 62 is provided with one or more convexities, while the other of the pair of head electrodes 61, 62 is provided with one or more concavities which can fit to the convexities.

With the fusion joining device for plastic tubes according to the present invention, the pair of heaters is made of a resistance heat generation material in the form of a sheet, being formed such that it is along the pair of members for heat conduction, respectively, thus, the thickness of the heater can be minimized, the entire device can be made compact, and the configuration of the heater and the members for heat conduction is simplified, which leads to the reduction in cost.

In addition, the fusion joining head is removably supported by the supporting head, thus a single supporting head can be commonly used with a plurality of types of fusion joining heads provided to suit to the diameters of the joint portion, which leads to the reduction in cost. Further, when the fusion joining head is loaded onto the supporting head, the pair of head electrodes is connected to each other, thus the operation of loading the fusion joining head and the operation of connecting the pair of head electrodes can be performed at a time, which results in a high operability. Further, at least one of the pair of head electrodes is energized in the direction in which it is connected to the other of the head electrodes, the pair of head electrodes can be always maintained in the proper connection condition.

Further, the pair of heaters is connected in series with each other, thus the same quantity of heat is generated from the pair of heaters when the joint portion is fusion joined, which means that the pair of heaters can heat the joint portion practically uniformly from both sides through the pair of members for heat conduction. Further, the pair of heaters is connected in series with each other through the pair of clamper electrodes such that, at least when the pair of clampers is pivoted to the closed position, the pair of clamper electrodes is connected to each other, thus in fusion joining the joint portion, the pair of heaters can generate the same quantity of heat.

Further, when the fusion joining head is loaded onto the supporting head, the data detection section detects the specific data, and on the basis of the specific data detected, the controlling means adjusts the power to the fusion joining head side, thus the proper power suited for the diameter of the joint portion can be supplied to the heater in the fusion joining head side. Further, after the completion of heating the joint portion, the cooling air is fed into the fusion joining head through the supporting head, and the air fed in is exhausted to the outside of the fusion joining head through the exhaust vents, thus the cooling air is sequentially fed into the fusion joining head, resulting in the heater being rapidly cooled, thereby the joint portion can be cooled in a short period of time, which means an improved fusion joining operability.

The heater is formed approximately in the shape of Ω in section, being provided with a central portion and both-end portions which extend from both ends of the central portion, respectively, thus by providing both-end portions for the heater, if the temperature of the tip of the both-end portion of the heater is lowered for some reason, the temperature of the greater part of the central portion and both-end portion of the heater is not lowered, which allows the joint portion to be properly heated, and because the metallic parts, such as the electrodes, can be disposed away from the joint portion, it is made difficult that the joint portion is contaminated by the oxide film of the metallic parts, which eliminates the need for frequent replacement of the metallic parts, and allows the running cost to be minimized.

What is claimed is:

1. A fusion joining device for plastic tubes that heats a joint portion of plastic tubes for fusion joining the joint portion, comprising:

a fusion joining head for sandwiching said joint portion from both sides to heat the joint portion, wherein said fusion joining head comprises a pair of members for heat conduction, a pair of clampers, and a pair of heaters;

said pair of members for heat conduction is disposed so as to be opposed to each other through said joint portion;

said pair of clampers is supported to be pivoted between a closed position where said pair of clampers sandwiches said joint portion from both sides through said pair of members for heat conduction, and an open position where a spacing between said pair of members for heat conduction is widened; and said pair of heaters is made of a resistance heat generation material in a sheet shape, and is arranged along said pair of members for heat conduction, respectively, for heating said joint portion through the pair of members for heat conduction, a supporting head for removably supporting the fusion joining head, and a heating circuit for supplying power to the fusion joining head through the supporting head; wherein said supporting head supports the pair of clampers pivotably between the closed position and the open position;

said heating circuit comprises a pair of head electrodes;

one of said pair of head electrodes is provided on the fusion joining head;

the other of said pair of head electrodes is provided on the supporting head;

said pair of head electrodes is connected to each other when the fusion joining head is loaded onto the supporting head; and at least one of said pair of head electrodes is energized in a direction in which the one of the pair of head electrodes is connected to the other of the pair of head electrodes.

2. The fusion joining device for plastic tubes of claim 1, wherein said pair of heaters is connected in series with each other.

3. The fusion joining device for plastic tubes of claim 1, wherein said heating circuit comprises a pair of clamper electrodes;

one of said pair of clamper electrodes is provided in one of said pair of clampers, being connected to one of said pair of heaters;

the other of said pair of clamper electrodes is provided in the other of said pair of clampers, being connected to the other of said pair of heaters;

said pair of heaters is connected to a power supply such that a voltage is generated across the pair of heaters; and said pair of clamper electrodes is disposed so as to be connected to each other at least when said pair of clampers is pivoted to said closed position.

4. The fusion joining device for plastic tubes of claim 1, further comprising controlling means for adjusting power to be supplied to said fusion joining head side through said supporting head; wherein said supporting head has a data detection section;

said fusion joining head has specific data for the fusion joining head;

said data detection section detects said specific data when said fusion joining head is loaded onto said supporting head; and said controlling means adjusts said power on the basis of the specific data detected by said data detection section.

5. The fusion joining device for plastic tubes of claim 1, wherein said pair of clampers comprises exhaust vents; and said exhaust vents are provided for exhausting cooling air fed into said fusion joining head through said supporting head to the outside of said fusion joining head.

6. The fusion joining device for plastic tubes of claim 1, wherein said fusion joining head comprises a pair of adiabatic members;

said pair of clampers comprises opposed surfaces and accommodation recesses;

said opposed surfaces are opposed to each other when said pair of clampers is in said closed position, and are provided with said adiabatic members;

said accommodation recesses are provided in said opposed surfaces for accommodating said heaters and said members for heat conduction;

each of said heaters is formed approximately in a shape of $\Omega$ in section, and includes a central portion and both-end portions which extend from both ends of the central portion, respectively;

the central portions of said heaters are situated in the accommodation recesses of said clampers along said members for heat conduction; and the both-end portions of said heaters are extended from the accommodation recesses toward the opposed surfaces along said adiabatic members.

* * * * *